No. 878,366. PATENTED FEB. 4, 1908.
E. A. EVANS.
MEANS AND METHOD FOR DETECTING AND PREVENTING FRAUD.
APPLICATION FILED FEB. 8, 1906.
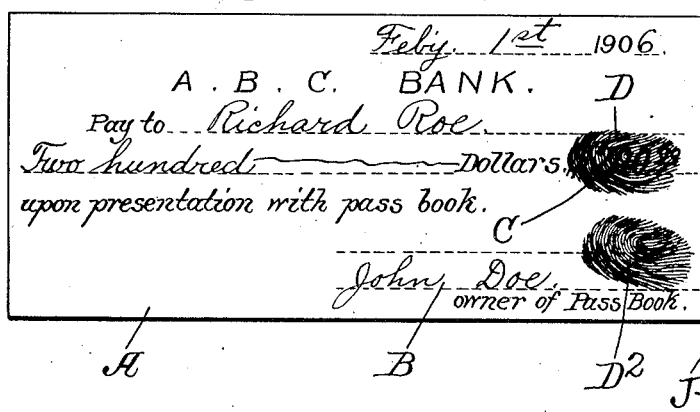
Fig. 1.
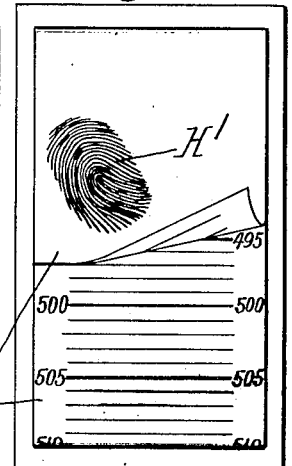
Fig. 3.
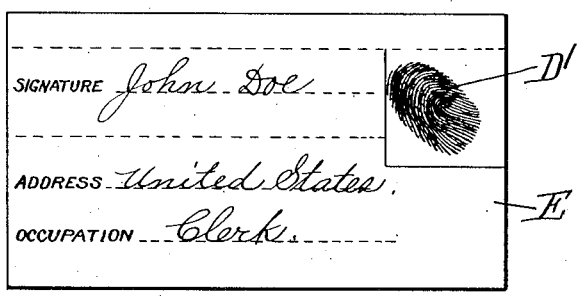
Fig. 2.
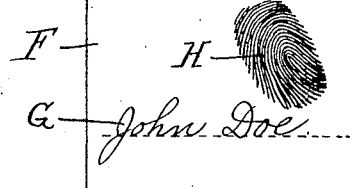
Fig. 4.
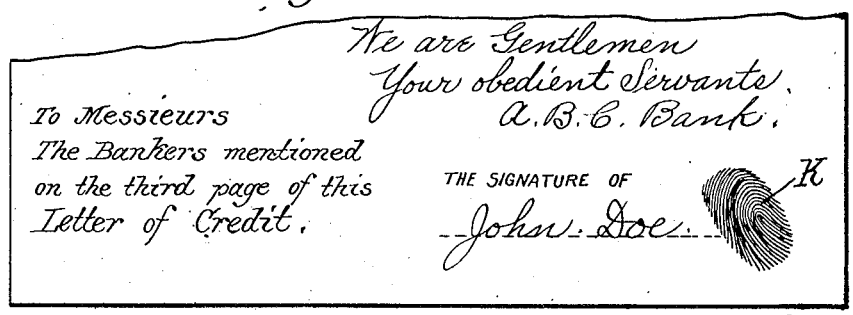

UNITED STATES PATENT OFFICE.

EDWARD A. EVANS, OF CHICAGO, ILLINOIS.

MEANS AND METHOD FOR DETECTING AND PREVENTING FRAUD.

No. 878,366.  Specification of Letters Patent.  Patented Feb. 4, 1908.

Application filed February 8, 1906. Serial No. 300,049.

*To all whom it may concern:*

Be it known that I, EDWARD A. EVANS, a citizen of the United States, residing at Chicago, in the county of Cook and State of Illinois, have invented a certain new and useful Improvement in Means and Method for Detecting and Preventing Fraud, of which the following is a specification.

My invention relates to methods and means for preventing fraud in connection with documents or things which have value either intrinsic or evidential.

The invention is illustrated in the accompanying drawings, wherein

Figure 1 is a view of a bank check; Fig. 2, a view of an identification card, Fig. 3, a view of a railroad mileage book, and Fig. 4, a view of a portion of a letter of credit.

Like parts are indicated by like letters of reference in all the figures.

My invention provides a simple and perfectly infallible means for imparting an identifiable or validating characteristic to documents or things of value which are executed or issued with the view of their becoming effective at a different time or place from that of their execution or issuance, and where the authenticity of the document or thing, the genuineness of some operative part thereof or the identity of the person seeking to put the same into effect may come into question.

The scope of the invention will be made clear by the description of the concrete exemplifications shown in the drawings. These examples show different adaptations to use of my invention, but upon analysis it will appear that the underlying principles are the same in all cases. It will furthermore be evident that these particular uses do not exhaust the possibility for applying the invention, but are described and set out merely for purposes of illustration.

Figure 1 shows a bank check A, having thereon the signature B, of the maker, the amount to be paid C, and an identifying mark D. This mark is made by the finger of the maker of the check and is preferably, though not necessarily, placed upon the amount for which the check is drawn. The mark may be made by moistening the end of the finger or the thumb with ink and so imprinting a mark upon the paper. The finger mark may also be made through the agency of an inking ribbon or carbon paper or in any other desired manner.

$D^1$ is an imprinted identifying finger mark, which, it will be seen, has all of the individual characteristics of the other mark D. This will be placed ordinarily upon the identifying card E which is kept on file in the bank, and is used for the comparison of any checks that may come in from this particular drawer.

$D^2$ represents a similar identifying finger mark on the check. This means of identification will not ordinarily be employed where an identification is kept on file. In case this method is used, the check will, of course, have to be sent to the drawer for identification.

In Fig. 3 an ordinary railroad mileage book is shown, F representing the cover bearing the signature G, of the owner, and an imprinted identifying finger mark H. J represents the mileage strip of any desired form. Ordinarily the person using the book is obliged to place his name upon the back of the portion of the strip that the conductor or ticket agent tears and this may be done when my invention is employed. It will not, however, be necessary under all circumstances that the signature should appear at all as the identity of the user will be amply proven by the imprinted identifying finger mark shown at $H^1$.

Fig. 4 represents a letter of credit where the application of my invention will be obvious. The letter may bear, as shown, the imprinted identifying mark K. The banker who issues the letter of credit may in such case require the person to whom the letter is issued to make duplicate identifications and these or photographic copies thereof may be transmitted to the banker's correspondents. The possession of the letter of credit thus authenticated, together with the ability to duplicate the mark with the possibility of comparison of the mark so made with the sample or typical identification sent to the correspondent will be an absolute preventive of fraud. In many cases it would probably be sufficient for the person to whom the letter is issued to imprint the identifying mark on the letter at the time of its issuance and to duplicate the mark whenever required by any of the correspondents. In such case the issuance of the letter by the banker would be a guaranty of the mark thereon and sufficient identification for the person applying for money at any other correspondent bank.

The above will be sufficient to illustrate the general purpose and scope of my invention. It will be apparent that it is capable of a very wide application in authenticating or validating documents having a value either intrinsic, such for example, as a negotiable note or check, or merely evidential. In using the word "value" in connection with a document, I intend either sort of value. It will be understood that I use the term "finger mark" in a broad signification. The mark might be impressed, made or imprinted on the document by the thumb or any other part of the hand though doubtless with less convenience. The individuality of a person is infallibly shown by the lineations of the skin of certain parts of the body. This lineation is markedly characteristic in the skin of the hand and particularly in the skin at the ball of the thumb or finger. My invention contemplates applying a mark made by such an individually characteristic part of the human body to a document for the purposes of authentication and identification.

Referring particularly to Fig. 1, it is seen that the mark D is placed directly over the numerals indicating the amount for which the check is drawn. The mark will, in fact, be preferably so placed upon the check after these numerals are placed on it. This will effectively prevent raising the check because the erasure of the figures could not be effected without erasing a portion of the identifying mark which, of course, the person tampering with the check would be absolutely unable to restore.

I claim:

1. A document bearing matter constituting it evidence for the payment of money or other valuable thing having an identifying characteristic associated therewith consisting of an imprinted finger mark superimposed upon an effective part of said document so that such part cannot be changed without detection.

2. A document bearing matter constituting it a valid claim for the payment of money or other valuable thing which has associated therewith an identifying characteristic consisting of the imprinted finger mark of one of the parties to said document, said mark being superimposed upon the indication of the money or valuable thing for which said document purports to be a claim.

EDWARD A. EVANS.

Witnesses:
PERCIVAL H. TRUMAN,
HOMER L. KRAFT.